Sept. 7, 1965     D. J. RECKERS ETAL     3,204,879
METHOD AND APPARATUS FOR CONTROL OF COMMINUTOR
Filed April 15, 1963     2 Sheets-Sheet 1
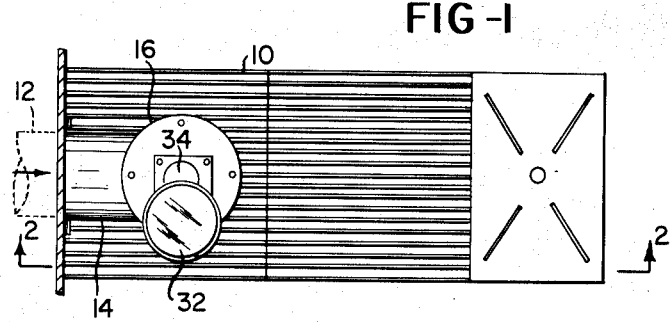
FIG-1
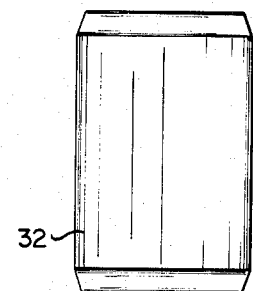
FIG-3
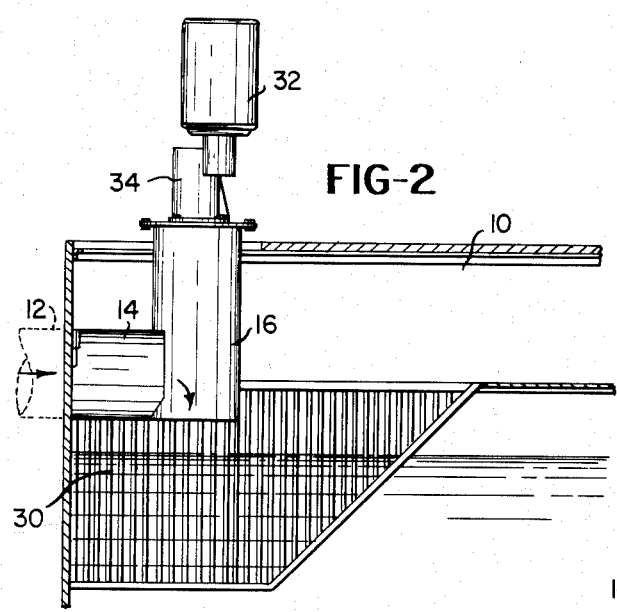
FIG-2
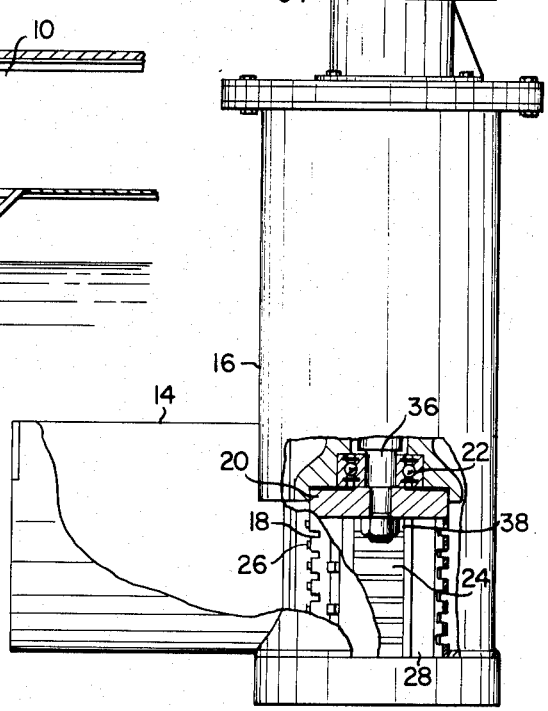
INVENTORS
DONALD J. RECKERS
JAMES E. JUMP
BY THOMAS W. DAY
ATTORNEY

INVENTORS
DONALD J. RECKERS
JAMES E. JUMP
BY THOMAS W. DAY

ATTORNEY

United States Patent Office 3,204,879
Patented Sept. 7, 1965

3,204,879
METHOD AND APPARATUS FOR CONTROL OF COMMINUTOR
Donald J. Reckers, Cincinnati, Ohio, James E. Jump, Elliston, and Thomas W. Day, Covington, Ky., assignors to Aer-O-Flo Corporation, Cincinnati, Ohio, a corporation of Ohio
Filed Apr. 15, 1963, Ser. No. 273,032
2 Claims. (Cl. 241—27)

The present invention relates to a method and apparatus for controlling operation and behavior of the comminutor commonly employed as an element of a sewage treatment plant. The comminutor, which performs to disintegrate and reduce solids generally present in sewage; by shredding or tearing the solids between movable and stationary banks of teeth or cutters, is responsible for the effective operation of any sewage plant. Failure of the comminutor to perform its function of reducing the size of objects or materials fed thereto along with the fluid content of sewage, invariably disables the treatment plant and leads to very expensive and troublesome servicing, particularly when the plant serves a busy commercial establishment or a community of dwellings continuously directing sewage to the plant.

A common source of trouble in sewage plants results from the introduction of materials such as towels, sanitary napkins, and other fabric products which may tend to clog the comminutor as it rotates, thereby interfering with the desired passage of liquids depended upon to flush the comminutor and keep it clear of obstructions.

In the larger treatment plants, the comminutor is usually driven continuously to disintegrate the solids, the practice being to reduce solids to particles which will pass a quarter-inch screen before entering the oxidizing and settling areas of the plant structure. In the effort to avoid clogging of the rotary comminutor by articles such as might cling thereto, various proposals have been offered, such as driving the comminutor first in one direction of rotation for a predetermined period of time, and then automatically reversing the direction of rotation for an equal period of time. This plan proved ineffectual since clogging or jamming of the comminutor by fabric like products contained in the sewage would occur whether the comminutor was being rotated in one direction or another.

Under another plan which proved largely ineffectual, and very destructive of the comminuting mechanism, the comminutor was driven forcefully by an oversize motor with the object of grinding by force any solid substance or article fed thereto. The latter system not only failed to regularly dislodge jams of clinging materials, but resulted also in excessive power consumption and expensive mechanical repairs.

An object of the present invention is to eliminate the objectionable features above mentioned, thereby improving the sewage treatment system as a whole and increasing its efficiency.

Another object is to provide simple electrical means in the comminutor drive mechanism, whereby overloading of the driving motor by clogging of material automatically reverses the direction of comminutor rotation suffiicently only to afford it a new bite into the clog, this action being repeated again and again until the clog yields to restore the system to regular operation at which the comminutor resumes unidirectional rotation only.

Another object is the inclusion of electrical control means in the system above referred to, which ensures automatic resumption of the drive for the comminutor in its principal or most effective direction of rotation following any interruption to the supply of electric current to the driving motor.

A further object of the invention is to avoid the necessity for manual operation of the drive motor control apparatus for restoring the system to normal operation, following a current interruption or a motor stoppage due to clogging of the comminutor.

The foregoing and other objects are attained by the means described herein and illustrated upon the accompanying drawings, in which:

FIG. 1 is a top plan view of a sewage treatment plant incorporating the improvements of the present invention.

FIG. 2 is a fragmentary side elevation of the same.

FIG. 3 is an enlarged side elevational view of the comminutor unit of the plant.

Figure 4:
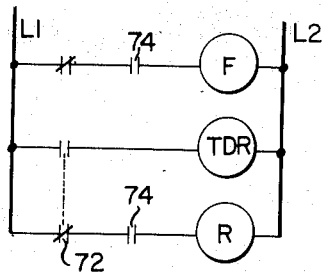
FIG. 4 is a wiring diagram showing schematically the elements of a time delay relay utilized in controlling a driving motor.
Figure 5:
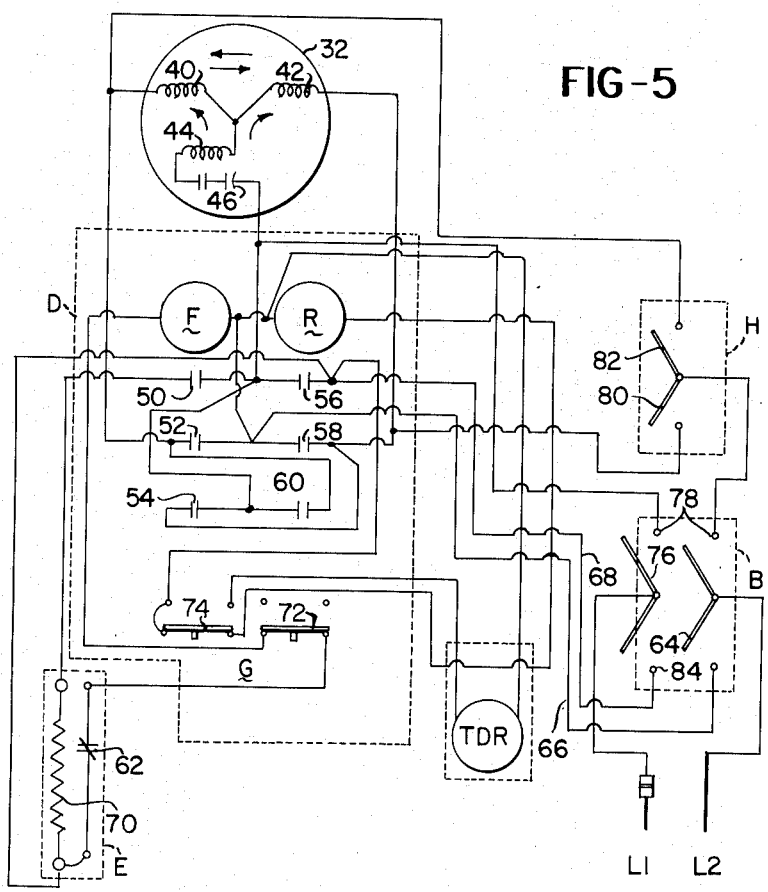
FIG. 5 is a detailed wiring diagram of various control means for the driving motor.

With reference to FIGS. 1 to 3 of the drawings, 10 indicates a tank for sewage directed thereto by a pipe 12, the pipe delivering its contents to an open-topped trough 14 within the tank. Trough 14 has direct connection with the upright housing 16, near its lower end, for directing the sewage into contact with teeth or cutters 18 carried by a rotary drum-like comminutor 20 journalled for rotation as at 22 within the housing. The comminutor body is provided with one or more peripheral screens 24 gauged to pass comminuted material in the form of particles which have been reduced in size by the action of teeth or cutters 18. The inner wall of housing 16 may be provided with stationary teeth or cutters 26 cooperating with those of the drum element 20, for shredding or shearing the solids as the drum element rotates.

The lower end 28 of the comminutor or drum element 20 is open for discharging all solid particles and effluent that pass through screen 24, to the lower portion 30 of tank 10 where screening, oxidation, and settling take place. The teeth or cutters 18 and 26 are so arranged relatively, that the shearing and shredding action thereof is most effective while the drum element rotates in one principal direction, clockwise for example. It should be understood that the drum element and the housing may each carry a multiplicity of teeth or cutters operative upon the solids fed by trough 14.

If at any time a large wad of cloth, for example, is presented to the teeth of the rotary communicator drum, there is the possibility of the wad creating a jam between the drum and housing 16, to the extent of stalling the driving motor for the drum. In other instances if such jamming does not actually stall the driving motor it may create a substantial overload which might either damage the motor or trip an overload protector which breaks the motor circuit. In either case, the comminutor was heretofore rendered inoperative.

With further reference to the drawings, 32 indicates an electric motor which, through a speed reduction gear box 34, drives the upright shaft 36 to which the drum or comminuator is fixedly secured as by means of a nut 38 applied to the lower end of shaft 36. The comminutor shaft may rotate normally at a speed approximating 30 r.p.m. Motor 32 is of the continuous-operation instant reversing type, having other qualifications which will become evident in the description of its control system.

In the wiring diagram, motor 32 is seen to be an induction motor having field windings 40, 42, 44, and a built-in centrifugal starting switch 46. By reversing the current flow through the windings, the direction of rotation of the motor armature may be reversed.

F and R represent the holding coils of forward and reverse electric switches whose contactors are indicated at 50, 52, 54, and 56, 58, 60, respectively. When the contactors controlled by coil F are closed, those of coil R are open-circuited and the motor is caused to rotate in a forward or principal direction of rotation corresponding to the preferred and most effective working rotation for comminutor 20. The motor initially is placed in operation by closing the contacts 64 of a hand-off-automatic switch B connected to the power leads L1 and L2, which through conductors 66 and 68 supply current to the contacts and the holding coil of switch F.

Motor M will continue to operate in the forward or principal direction until such time as a jamming of material at the comminutor causes the motor to overload and stall. The overload created by the stall permits the centrifugal starting switch 46 within motor 32 to close thereby programming the motor for reverse rotation. The overload also results in a substantially instantaneous rise in temperature of heater coil 70 of the quick-trip thermal overload relay E, causing contact 62 to open for de-energizing the hold coil F, at which time the normally closed auxiliary contacts 72 complete the circuit through contact 74 of the time delay relay TDR. This energizes coil R which instantly reverses motor 32 for the duration of the time setting of relay TDR, thereby affording the comminutor an opportunity to clear the jam. At the end of the time settting of relay TDR, holding coil R of the reversing switch is de-energized, and contacts 56, 58, 60 are thereby open-circuited to stop the reverse rotation of the motor.

After an approximate 45-second automatic re-set period, the overload relay E reestablishes its circuit to holding coil F, thereby closing the contacts 50, 52, 54 to energize the motor for rotation in the forward or principal direction of rotation.

Now if the jam at the comminutor still is not broken, stalling of motor 32 will again occur at once, and the overload relay E and time delay relay TDR will once again perform to initiate limited reversal of the motor followed by a resumption of forward rotation, in an effort to break the jam. This procedure will be repeated until by a series of rather rapid attempts, the comminutor finally succeeds in dislodging the stoppage. Once the stoppage is overcome, the comminutor continues rotation in the principal direction only, until such time as another jam or stoppage occurs.

It is important to note that the motor control means, in the event of jamming, allows for only a very limited reversal of the comminuator intermediate successive attempts to drive the comminutor in the principal or forward direction of rotation. For example, the comminutor may never reverse its rotation as much as one full turn, although in the principle direction of rotation it may rotate indefinitely or until jamming occurs. This is of utmost importance, since excessive rotation of the comminutor in the reverse direction performs no substantial service in dislodging a jam, but instead, wastes precious time that should be utilized in rotating the comminutor in the principal direction most effective for disintegrating the jammed material. Time lost during reverse rotation of the comminutor can result only in aggravating the stoppage because the feeding of sewage by pipe 12 is usually continuous and therefore tends to overwhelm the plant while the system works to overcome the temporary stoppage at the comminutor.

If desired, switch or contactor B may include a pair of contacts 76 to be manually closed for conditioning the system for manual control of motor 32. When contacts 76 are closed upon the terminals 78, the manual forward-reverse switch H may be utilized for manual control of the motor, by switching the movable contactors 80 or 82 alternatively into the motor circuit. Normally, however, the system operates automatically with switch 64 closed upon its contacts 84, while contactors 76, 80 and 82 remain open-circuited.

The character G indicates diagrammatically a mechanical interlock connected in circuit with the thermal overload relay and the holding coils F and R of the main motor control switch D. The time delay relay TDR is by preference one which includes a pneumatic or hydraulic timer which can be set for predetermined delayed action of the order of 60-seconds or less, preferably.

With the arrangement herein disclosed, jamming of the comminutor immediately and automatically conditions the circuitry for short-period reversal of the comminutor and resumption of its normal or principal direction of rotation, in alternation and repeatedly, so long as the jam persists. The comminutor thereby in effect makes as many rapid passes at the stoppage as may be necessary to dislodge it, without affording time for a serious build-up of sewage and waste within the trough 14. All of the foregoing is accomplished without damage to the mechanical elements of the apparatus, and with a minimum consumption of electric energy.

It is to be understood that various modifications and changes may be made in the structural details of the apparatus, within the scope of the appended claims, without departing from the spirit of the invention.

What we claim is:

1. In a sewage treatment plant receptive of mixed fluids and solids, a rotary comminutor including means operative upon rotation of the comminutor in a principal direction of rotation to reduce the solids to particles, a reversible electric motor including circuit control means operative to energize the motor for rotation in a principal direction of rotation, and alternatively in a reverse direction of rotation, means drivingly connecting the motor with the comminutor for rotating the latter in correspondency with rotation of the motor, and means included in the circuit control means, and operative upon overloading of the motor while rotating in the principal direction of rotation, to instantly reverse the motor rotation sufficiently only to reverse the comminutor through less than one full rotation, and thereafter to effect and maintain after a time delay rotation of the motor in the principal direction indefinitely in the absence of a motor overload.

2. A method of sewage treatment which comprises the steps of subjecting waste materials to the disintegrating action of a rotary comminutor rotating principally in one direction, reversing the direction of comminutor rotation instantly whenever the comminutor encounters a predetermined resistance to rotation, rotating said comminutor in a reverse direction for only part of a revolution thereof, and then after a time delay restoring the comminutor to principal direction of rotation, the reversing and restoring of direction occurring in alternation until such resistance to principal rotation is overcome, whereupon rotation of the comminutor in principal direction continues until subsequent resistance of a predetermined value reoccurs.

References Cited by the Examiner

UNITED STATES PATENTS

| 2,548,709 | 4/51 | Drexler | 318—475 X |
| 2,551,395 | 5/51 | Rimann | 241—36 X |
| 2,594,974 | 4/52 | Mylting | 241—36 |
| 2,678,775 | 5/54 | Simmons | 241—36 X |
| 2,947,486 | 8/60 | Higer | 241—36 |
| 3,112,079 | 11/63 | Niekamp et al. | 241—36 X |

J. SPENCER OVERHOLSER, *Primary Examiner.*